United States Patent Office 2,997,443
Patented Aug. 22, 1961

2,997,443
MODIFIED NICKEL FERRITE
John M. Herbert, Horton, Northants, and Charles O'Hara, Blisworth, Northants, England, assignors to The Plessey Company Limited, Ilford, England, a British company
No Drawing. Filed Apr. 9, 1956, Ser. No. 577,176
3 Claims. (Cl. 252—62.5)

The invention relates to ferrite compositions. These are of use in the manufacture of magnetostrictive transducers.

Ferrites may in general be formulated as $M''O \cdot M'''_2O_3$ or $M''M'''_2O_4$ where $M''$ is a divalent, $M'''$ is a trivalent metal and O is oxygen.

The term "ferrite" is used herein only for convenience and does not imply any particular system of chemical bonding between the atoms of which these compositions consist.

The invention provides a ferrite composition comprising 1 to 1.2 molecular equivalents of $M''O$ and 1 to 1.2 molecular equivalents of $M'''_2O_3$ wherein:

$M''$ represents 1 atomic equivalent of a divalent metal and consists of from 0.95 to 1 atomic equivalents of nickel together with 0.05 to 0 atomic equivalents of cobalt;

$M'''$ represent 1 atomic equivalent of a trivalent metal and consists of 0.5 to 0.95 atomic equivalents of iron together with 0.05 to 0.5 atomic equivalents of chromium; and O represents 1 atomic equivalent of oxygen.

The compositions may also contain various impurities.

We have found that the replacement of part of the iron in nickel (or nickel-cobalt) ferrite by chromium has beneficial effects on the performance of the material in transducers. It increases the electro-mechanical coupling coefficient, particularly the value obtainable at remanence with no external field, and also the coercive force of the material.

The ferrite compositions according to the invention may conveniently be prepared by heating together a mixture of the appropriate oxides of nickel, chromium, iron, and if desired, cobalt. The product may then be ground, mixed with a suitable binder, shaped and subjected to prolonged heating to give a sintered ceramic body. The properties of the compositions produced are influenced by the intensity and duration of both stages of the heating; experimental tests show, for any particular composition, how the heating should be controlled to attain the most desirable results.

The following example is given by way of illustration and without limitation and describes the preparation of a ferrite composition according to the invention. These materials are weighed out and mixed—

| | G. |
|---|---|
| Nickel monoxide | 748 |
| Cobalt monoxide | 15.4 |
| Chromium sesquioxide | 304 |
| Ferric oxide | 1303 |

The raw materials are normal technical grades. The chromium oxide is a precipitated material which has not been ignited above 700° C. The iron oxide is a grade prepared for use as a paint pigment.

The mixture is first fired for one hour at 1100° C. and is then cooled and ground. The powder is mixed with a small amount of a plastic binder (e.g. 7% by weight of a 30% solution of butyl methacrylate in acetone); formed into suitable aggregates and pressed in a die to form a suitable shape: preferably a ring for the purpose of evaluating the material. The shape is then fired in air at 1360° C. for 48 hours to give a sintered ceramic body. A ring prepared by this method gives a maximum value of electromechanical coupling coefficient of 0.26 and a value at remanence of 0.245. The material has a coercive force of 9.5 oersteds. Less prolonged firing gives a lower coupling coefficient and a higher coercive force.

The material is of value in transducers because the high coupling coefficient allows a high efficiency over a wide range of frequencies while the high coercive force permits the construction of transducers without permanent magnets, or other sources of static magnetic fields, which would otherwise be required to maintain a field in the magneto-strictive material.

Table 1 below sets out the proportions of oxides used in three mixtures A, B, and C which are converted into ferrite compositions using firing processes similar to that described above. Table 2 gives the firing conditions used for mixtures A and B and for two separate samples of mixture C indicated as $C_1$ and $C_2$ respectively.

Table 1

| Mix | Atom Equivalents of Chromium | Weights of Constituents | | | |
|---|---|---|---|---|---|
| | | Nickel Oxide | Cobalt Oxide | Chromic Oxide | Ferric Oxide |
| A | 0.15 | 74.8 | 1.54 | 22.8 | 139.2 |
| B | 0.2 | 73.2 | 1.50 | 30.4 | 128.0 |
| $C_1$ and $_2$ | 0.4 | 74.8 | 1.54 | 60.8 | 97.9 |

Table 2

| Mix | Prefire | | Final Fire | |
|---|---|---|---|---|
| | Temperature, °C. | Time, hours | Temperature, °C. | Time, hours |
| A | 1,100 | 1 | 1,480 | 1 |
| B | 1,100 | 1 | 1,390 | 24 |
| $C_1$ | 1,250 | 4 | 1,360 | 46 |
| $C_2$ | 1,100 | 1 | 1,400 | 19 |

The properties of the ferrite compositions so produced are summarised in Table 3. The quantity $Q_m$ is obtained from the width of the resonance peak in a plot of impedance against frequency for a wound toroid. It is only an approximate value, somewhat lower than the true one, due to a slight degree of mechanical clamping on the ferrite ring during the measurement.

Table 3

| Material | A | B | $C_1$ | $C_2$ |
|---|---|---|---|---|
| Saturation Magnetisation gauss $4\pi I_s$ | 1,100 | 1,510 | 178 | 101 |
| Coercive Force, oersteds | 14 | 10 | 17.5 | 29 |
| Young's Modulus, Dynes/cm.$^2 \times 10^{12}$ | 1.03 | 1.19 | 1.21 | 0.69 |
| Mechanical Quality, $Q_m$ | 1,270 | 528 | 103 | 250 |
| Reversible permeability | 12.6 | 17.6 | 5.79 | 4.64 |
| Electro-mechanical Coupling-coefficient, $K$ | 0.155 | 0.23 | 0.27 | 0.17 |
| Joule Magnetostriction, Constant $\lambda$, dynes/gauss: | | | | |
| cm.$^2 \times 10^3$ | 12 | 16.5 | 34.8 | 18.5 |
| $Q_m k^2$ | 30.5 | 27.9 | 7.5 | 7.2 |
| $k^2/\lambda$ | 2.0 | 3.2 | 2.1 | 1.5 |

The quantity $Q_m k^2$ is a measure of the adaptability of the material for use in magnetostrictive filters. $k^2/\lambda$ is a measure of the change in flux it will give for an applied stress.

It can be seen that materials A and B have suitable characteristics for use in filters. Material B is the most suitable for transducers converting mechanical stress into electrical energy (e.g. hydrophones). Material $C_1$ is suitable for acoustic generators and also for devices which serve both as receivers and generators of acoustic energy.

$C_2$ has similar uses to $C_1$ but has a particularly high coercive field.

It will be observed that the materials $C_1$ and $C_2$ have different properties as a result of the different firing conditions employed.

What is claimed is:

1. A sintered ferrite body with a high coupling coefficient of about 0.155 to about 0.27 and having the general formula $xM''O.yM'''_2O_3$ wherein $x$ represents the molecular equivalents of $M''O$ and is from 1 to 1.2 and $y$ represents the molecular equivalents of $M'''_2O_3$ and is from 1 to 1.2, at least about 95 mol percent and less than 100 mol percent of $M''O$ consisting essentially of NiO and the remainder of said $M''O$ consisting essentially of CoO, 60 to 95 mol percent of said $M'''_2O_3$ consisting essentially of ferric oxide and the remainder of said $M'''_2O_3$ consisting essentially of chromium sesquioxide, said body having been sintered at temperatures of about 1360° to 1480° C.

2. A sintered ferrite as claimed in claim 1 wherein said $M''O$ contains about 98 mol percent of NiO and about 2 mol percent of CoO.

3. A sintered ferrite body for having a relatively high value of $Q_mK^2$ of about 27.9 to about 30.5 suitable for magnetostrictive transducer and filter applications where K is the electromechanical coupling coefficient and $Q_m$ is the mechanical quality of said ferrite, said ferrite having the general formula $xM''O.yM_2'''O_3$ wherein $x$ represents the molecular equivalents of $M''O$ and is from 1 to 1.2 and $y$ represents the molecular equivalents of $M_2'''O_3$ and is from 1 to 1.2, about 98 mol percent of $M''O$ being NiO and the remainder consisting essentially of CoO, about 80 to 85 mol percent of $M_2'''O_3$ being $Fe_2O_3$ and the remainder consisting essentially of $Cr_2O_3$, said body having been sintered at temperatures of about 1360° to 1480° C.

References Cited in the file of this patent

UNITED STATES PATENTS

| | | |
|---|---|---|
| 1,976,230 | Kato et al. | Oct. 9, 1934 |
| 2,736,708 | Crowley et al. | Feb. 28, 1956 |

FOREIGN PATENTS

| | | |
|---|---|---|
| 697,059 | Great Britain | Sept. 16, 1953 |
| 523,180 | Belgium | Oct. 31, 1953 |
| 524,097 | Belgium | Nov. 30, 1953 |
| 756,383 | Germany | Oct. 20, 1952 |
| 927,259 | Germany | May 2, 1955 |

OTHER REFERENCES

Weil: Comptes Rendus, vol. 234, p. 1352, March 24, 1952.

Bozorth: Physical Rev., September 15, 1955, pp. 1788, 1791, 1792.

Gorter: Philips Res. Rpts., December 1954, pp. 432, 438, 441.

Kordes et al.: Chemical Abstracts, vol. 46, column 4411, May 25, 1952.

Philips Research Reports, vol. 8, NR5, October 1953, p. 337.

RCA Review, September 1950, pages 344–346.